(12) United States Patent
Fobian

(10) Patent No.: US 10,172,346 B2
(45) Date of Patent: Jan. 8, 2019

(54) HEAD PUMPING WATERFOWL DUCK DECOY APPARATUS

(71) Applicant: Todd B. Fobian, Calera, AL (US)

(72) Inventor: Todd B. Fobian, Calera, AL (US)

(*) Notice: Subject to any disclaimer, the term of this patent is extended or adjusted under 35 U.S.C. 154(b) by 134 days.

(21) Appl. No.: 15/293,265

(22) Filed: Oct. 13, 2016

(65) Prior Publication Data

US 2018/0103633 A1   Apr. 19, 2018

(51) Int. Cl.
*A01M 31/06* (2006.01)
*F16H 37/12* (2006.01)

(52) U.S. Cl.
CPC ........... *A01M 31/06* (2013.01); *F16H 37/124* (2013.01)

(58) Field of Classification Search
CPC .............................. A01M 31/06; F16H 37/124
See application file for complete search history.

(56) References Cited

U.S. PATENT DOCUMENTS

| | | | | |
|---|---|---|---|---|
| 2,480,390 A * | 8/1949 | Thompson | ............. | A01M 31/06 43/3 |
| 2,622,360 A * | 12/1952 | Bertram | ................. | A01M 31/06 43/3 |
| 2,799,960 A * | 7/1957 | Riley | .................... | A01M 31/06 43/3 |
| 2,835,064 A * | 5/1958 | Webb | ..................... | A01M 31/06 43/3 |
| 3,916,553 A * | 11/1975 | Lynch | .................... | A01M 31/06 43/3 |
| 4,845,873 A * | 7/1989 | Hazlett | .................. | A01M 31/06 43/3 |
| 6,553,708 B1 * | 4/2003 | Wolfe | .................. | A01M 31/025 119/482 |
| 6,553,709 B1 * | 4/2003 | Owen | ................... | A01M 31/06 43/3 |
| 2008/0184668 A1 * | 8/2008 | Monti | ....................... | B65B 7/28 53/53 |
| 2009/0272020 A1 * | 11/2009 | Bill | ........................ | A01M 31/06 43/3 |
| 2015/0059227 A1 * | 3/2015 | Kubinec | ................ | A01M 31/06 43/2 |
| 2015/0208640 A1 * | 7/2015 | Marsh | ................... | A01M 31/06 43/3 |

* cited by examiner

*Primary Examiner* — Christopher R Harmon

(57) ABSTRACT

A waterfowl decoy apparatus provides simulated head pumping movement of a bird's head in an up and down vertical path defined by a cam support and cam follower rod. A cam follower rod with flat base is inserted into a holed frame which sits on an off center cam. The cam supports the decoy head positioned on the cam follower rod, and a small battery operated motive device moves the off center cam in circular direction. This cam mechanism causes the decoy head to move in an up and down vertical motion. In addition an alternative method for decoy head to move in a vertical path is defined by a "level wind" mechanism having a channel guide mounted for traversing a reversible groove shaft by means of a follower as the shaft is rotated. The device is mounted and enclosed inside a hollow duck decoy with a detachable back to access internal components.

3 Claims, 11 Drawing Sheets

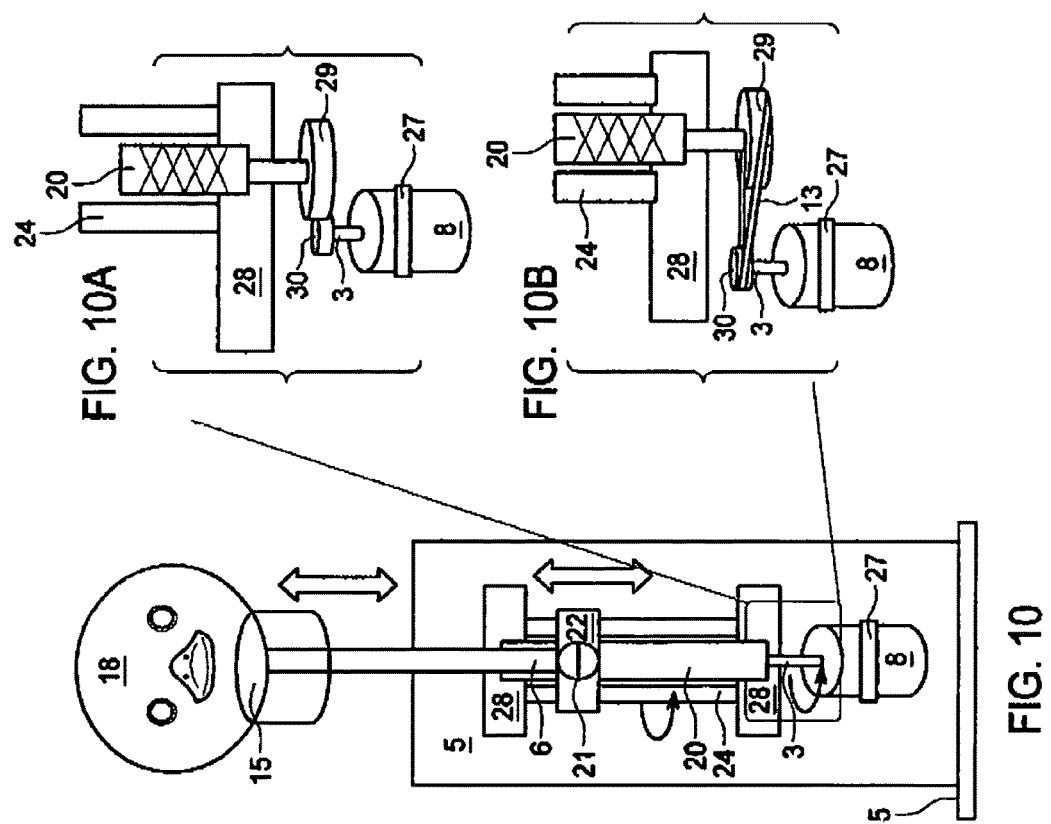

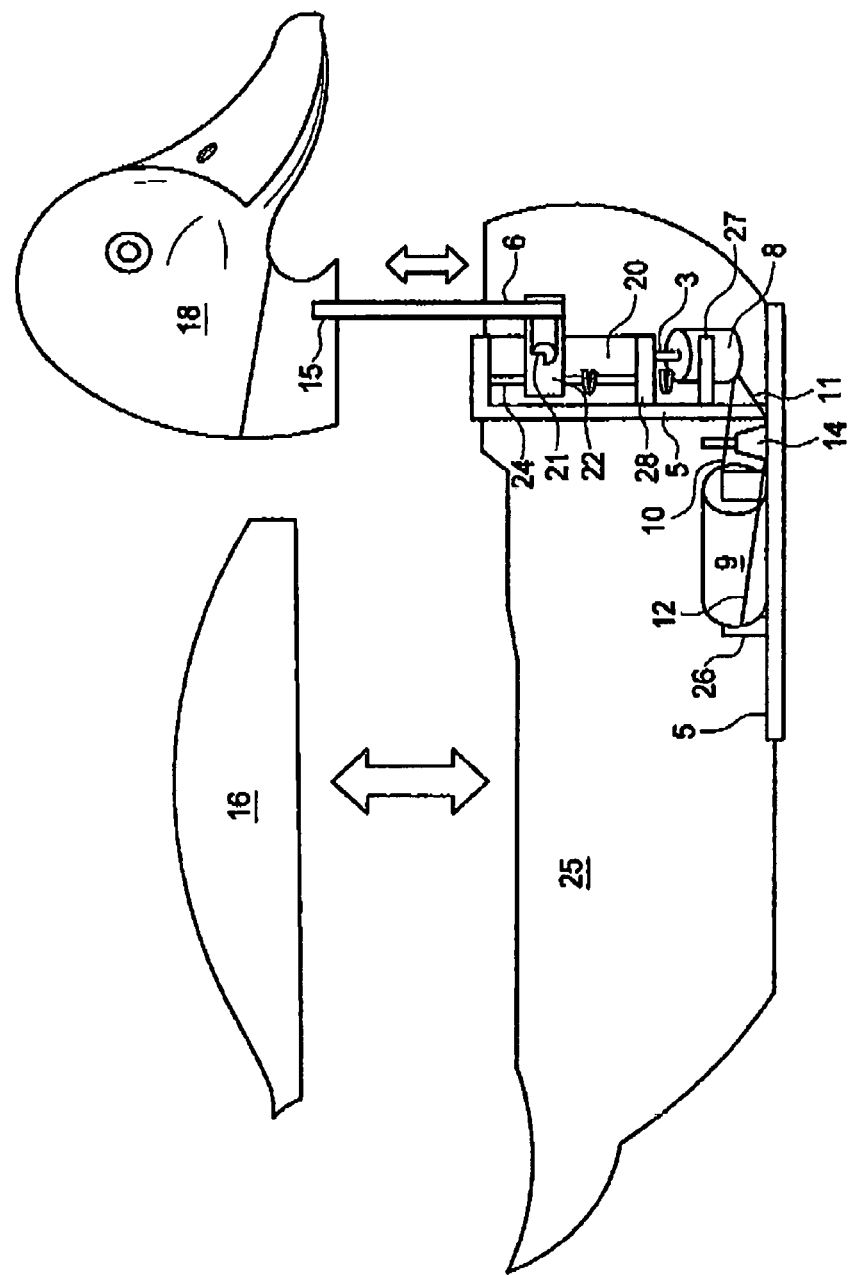

HEAD PUMPING WATERFOWL DUCK DECOY APPARATUS

CROSS-REFERENCE TO RELATED APPLICATIONS

This application claims the benefit/priority of U.S. Provisional Application No. 62/242,411, filed Oct. 16, 2015 and U.S. Provisional Application No. 62/251,882, filed Nov. 6, 2015

STATEMENT REGARDING FEDERALLY SPONSORED RESEARCH OR DEVELOPMENT

Not Applicable

REFERENCE TO SEQUENCE LISTING, A TABLE, OR COMPUTER PROGRAM LISTING COMPACT DISC APPENDIX

Not Applicable

ABSTRACT

A waterfowl decoy apparatus provides simulated head pumping/bobbing movement of a bird's head in an up and down vertical path defined by a cam support and cam follower rod. A cam follower rod with flat base is inserted into a holed frame which sits on an off center cam. The cam supports the decoy head positioned on the cam follower rod, and a motive device moves the off center cam in circular direction. This cam mechanism causes the decoy head to move in an up and down head pumping/bobbing motion. In addition to a rotating cam mechanism an alternative method for decoy head to move in an up and down vertical path is defined by a "level wind" mechanism having a channel guide mounted for traversing a reversible groove shaft (worm gear) by means of a follower (pawl), as the shaft is rotated. The mounted carriage follower (pawl) is equipped with an attached vertical rod. The attached vertical rod supports the decoy head and neck, and a motive device rotates the reversible groove shaft (worm gear) in circular direction. This circular rotation to the reversible groove shaft (worm gear) causes the decoy head to move in an up and down head pumping motion as the carriage follower (pawl) transverses the reversible groove shaft (worm gear). The decoy attachment vertical rod holds the head which attaches to the channel guide which also holds the carriage follower (pawl). The motive device includes a small battery operated motor with off/on switch which is attached to a larger shaft cam by rubber belt or alternative worm gear and pawl. The decoy attachment post holds the head. The device is mounted and enclosed inside a hollow traditional duck decoy with a detachable back to access motor controls, belt, cams, gears and batteries. The apparatus includes two to four 1.5 volt D-size batteries and one electric motor with cams, belts, shafts, gears and rods extending to the head area.

BACKGROUND OF THE INVENTION

Traditionally duck decoys are stationary mimics of waterfowl placed during a hunt to entice birds toward a hunter. More recently devices have been developed, in some manner, to apply movements to these decoys in order to further simulate movement of animal to improve hunting success. This device attempts to mimic the mating dance behavior of some waterfowl species known as head pumping or head bobbing. This well documented behavior is when a bird raises and lowers its head in a rhythmic pattern to entice its mate. This device uses a simple off center cam (a mechanical device consisting of an eccentric curved wheel mounted on a rotating shaft, used to produce variable or reciprocating motion in another engaged or contacted part) and an alternative "level wind"worm gear/pawl (a mechanical device consisting of a follower traversing a reversible groove shaft) in which both are spun by a small motor to cause the head of the decoy to move up and down.

Several mechanical decoys have been developed with advantages in simulating the movement of a particular game species. The decoys use a variety of devices to generate the movement. Of course, the object of the simulated movement is to fool animals to be attracted into believing that the decoy is a real animal. Most of these prior movable decoys move in a manner to simulate feeding (forward and backward horizontal head movement), swimming (leg movement) or flying (wing movement). However, the present decoys are unable, in a simple manner, to fully simulate the realistic movement of waterfowl mating behaviors such as head pumping and bobbing. This is accomplished in this waterfowl decoy, such as by including up and down vertical head movement by small battery powered motor enclosed within a waterfowl mimicking body.

Thus, there is a need for a decoy apparatus, and related method of attracting waterfowl, which realistically and more completely simulates the mating behavior movements of bird head pumping/bobbing in a compact and transportable manner. Such a decoy would simulate an up and down vertical head motion movement for greater realism. Ideally, the decoy would also do such a movement with an apparatus which is compact, easy to transport and to deploy in the wild. Also, such a decoy would have a basic simple design, able to be operated with ease, would be reliable in most weather conditions and is fairly maintenance-free.

BRIEF SUMMARY OF THE INVENTION

The present invention relates to a battery powered apparatus providing a movable head for installation in waterfowl decoys for attracting waterfowl species, and more particularly, to duck decoys with moveable up and down vertical head parts to simulate life-like mating behavior movements of waterfowl. The apparatus is designed for installation in waterfowl decoys of hollow construction.

BRIEF DESCRIPTION OF DRAWINGS

The present invention will be more easily understood by reference to the following detailed description when read in conjunction with the attached drawings, wherein:

FIG. 4A is a schematic view of parts of the motive device and vertical head movement mechanism of the apparatus according to the present invention. It is a view of alternative Cam (1) 1A designs that can be substituted into the apparatus onto shaft (4) to achieve a variety of up and down vertical head movement patterns and distance.

FIG. 4B is a schematic view of parts of the motive device and vertical head movement mechanism of the apparatus according to the present invention. It is a view of alternative Cam (1) 1B illustrating a partially notched Cam (1) and notched Rod (6) mechanism that can be substituted into the apparatus onto shaft (4) to achieve a variety of up and down vertical head movement patterns and distance.

FIG. 4C is a schematic view of parts of the motive device and vertical head movement mechanism of the apparatus according to the present invention. It is a view of alternative Cam (1) 1C illustrating a stationary Cam (1) fixed arm attached to Rod (6) mechanism by free moving double jointed arm (19) that can be substituted into the apparatus onto shaft (4) to achieve a variety of up and down vertical head movement patterns and distance.

FIG. 8A is a schematic zoomed in view of the reversible groove shaft (worm gear) (20) and the carriage follower (pawl) (21) of the alternative "level wind" apparatus shown in FIG. 8.

FIG. 10 is an anterior view of the removed decoy alternative "level wind" apparatus shown in FIG. 7. It shows the operations mechanism of the forward portion of the apparatus as noted on FIG. 8

FIG. 10A is a schematic view of parts of the motive device and vertical head movement mechanism of the apparatus according to the present invention. It is a view of alternative grooved gears (29 and 30) design that can be substituted onto primary motor shaft (3) and reversible groove shaft (worm gear) (20) into the alternative "level wind" apparatus shown in FIG. 7 to impart variable speeds and patterns to reversible groove shaft (worm gear) (21) rotation to achieve a variety of up and down vertical head movement patterns.

FIG. 10B is a schematic view of parts of the motive device and vertical head movement mechanism of the apparatus according to the present invention. It is a view of alternative pulley (29 and 30) and belt (13) design that can be substituted onto primary motor shaft (3) and reversible groove shaft (worm gear) (20) into the alternative "level wind" apparatus to impart variable speeds and patterns to reversible groove shaft (worm gear) (21) rotation to achieve a variety of up and down vertical head movement patterns.

FIG. 11 is a side view of the decoy apparatus illustrating partial disassembly of back lid (16), battery replacement (9), and on/off switch (14) for ease of use and deployment in the field for use. Reference will now be made in detail to the present preferred embodiment of the invention, an example of which is illustrated in the accompanying drawings.

DETAILED DESCRIPTION OF THE INVENTION

Figure 1:
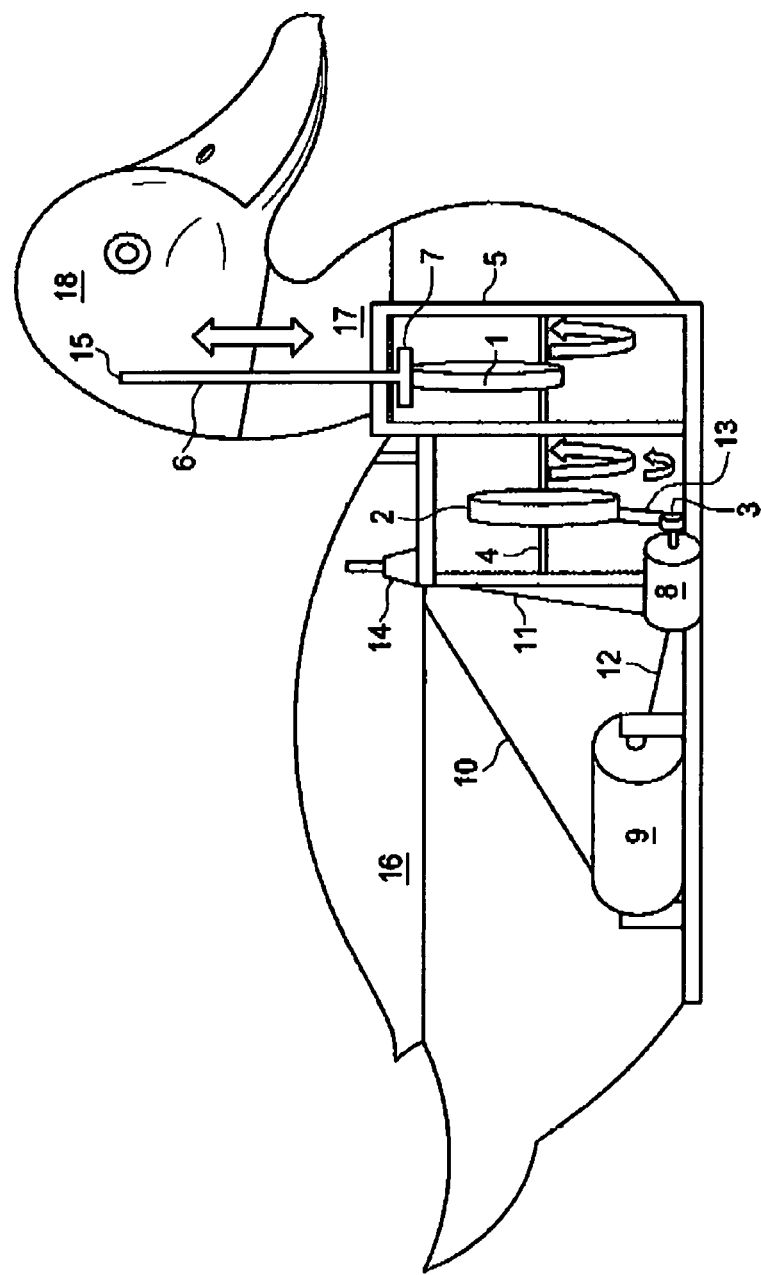
FIG. 1 is an oblique view of the commercial or handcrafted duck decoy in which the apparatus is mounted, including a modified neck, external switch and lid with latch to reach the apparatus. This side view shows the preferred embodiment of a decoy apparatus for simulating, as viewed from a distance, the movement of waterfowl decoy head in a particular up and down path according to the present invention.

The present invention relates to a battery-driven motor which drives a primary shaft. The shaft contains rotating centered and off center cams as well as alternative reversible groove shaft (worm gear) to raise and lower a shaft connected to a detached head of a waterfowl decoy that moves the head of the decoy in an up and down vertical motion to mimic waterfowl mating behaviors.

The operating mechanism consists of two to four D-cell batteries, a battery holder, an on-off circuit switch, one electric motor, a rotary motor shaft, motor cam, belt, primary shaft cam, primary shaft, off center cam and cam follower rod all mounted on a mounting bracket designed for installation into the hull of a decoy.

The outfitted decoy constantly moves its head up and down in a vertical direction simulating the movements made by a live duck during courtship movements to attract mates. Its electric motor is water sealed and will endure hard hunting conditions. It is powered by two to four easily changed D-cell alkaline batteries.

Therefore, it is an objective of the present invention to simulate the mating head pumping/bobbing behavior of some waterfowl species.

It is a further objective of the present invention that such a waterfowl decoy would do such a simulated up and down vertical head movement with an apparatus which uses a simple motion design for ease of operation, transport and set up in the wild.

It is yet another objective of the present invention to provide such a decoy that would be able to be reliably operated in most hunting weather conditions and is fairly maintenance-free.

Additional advantages and other novel features of the invention will be set forth in part in the description that follows and in part will become apparent to those skilled in the art upon examination of the following or may be learned with practice of the invention. The objects and advantages of the invention may be realized and obtained by means of the instrumentalities and combinations particularly pointed out in the appended claims.

To achieve the previous description, and in accordance with the purposes of the present invention as described herein, an apparatus for simulating realistic head pumping/bobbing movement of a waterfowl species in an up and down vertical head movement path is presented. The apparatus of the invention disclosed can be used with a variety of waterfowl decoys, in a variety of water conditions, and under a variety of weather conditions. In its comprehensive aspect, the head of the waterfowl decoy is mounted for the up and down vertical movement onto a follower rod sitting on an off center cam or attached to a pawl which rotates or follows in response to a motive device rotating a primary shaft. In accordance with the preferred example, a waterfowl decoy thus moves in response to the motive device as if moving its head up and down vertically on a rod attached to a floating hollow decoy which secures the decoy movement mechanisms. The motive device in a preferred embodiment includes a motor powered by a battery supply with on/off switch for motor shaft rotating power. The motor shaft is attached to the primary shaft with a belt and larger centered cam attached to the primary shaft (alternative worm gear mechanism in place of belt and centered cam allows for connection from motor to off center cam bypass). The primary shaft enters a mounting frame which allows for the shaft to rotate within the frame which encloses the cam. This cam is off center and rotates to move the cam follower rod which sits on top of the off center cam. When the cam rotates, the head cam follower rod moves in an up and down motion vertically. This cam follower rod is attached to the decoy head and simulates the up and down head pumping/bobbing motion of some mating species of waterfowl.

In the operation of the apparatus and in the practice of the preferred method of the present invention, when the operator turns the devise on engaging the batteries to complete circuit, the motor rotates its shaft, in turn rotating the primary shaft by belt and pulley (or alternative worm gear) to rotate an off center cam which raises and lowers the decoy head cam follower rod in a vertical direction. When the operator of the apparatus turns the device switch off the battery circuit is closed and stops mechanic movement of the apparatus.

Cam design and shape can be manipulated, in such a manner as to realistically simulate the movement of real bird movements and rhythmic patterns during waterfowl mating behavior rituals. As is apparent, the decoy can be made in the form of any waterfowl and can be used on substantially any water body and under a variety of weather conditions. In accordance with other aspects of the preferred embodiment, the cam shape of the primary shaft, which moves the cam follower rod decoy head, along with using alternative "level wind" worm gear and pawls, allows for variations in rhythmic patterns and head pumping/bobbing motions. It is rotated and driven by a rotary shaft motor that exhibits a substantially constant torque over its range of operation. The motor voltage and torque maintains the proper tension, power, force and battery life to continue decoy head pumping/bobbing action during a hunt.

A rotating support in the form of a pulley is a part of the spinning mechanism. The first centered cam is attached to the motor shaft by belt (or alternative motor shaft to worm gear connection to off center cam). This arrangement causes the primary shaft of decoy to rotate 360 degrees continually while motor is engaged by battery power circuit. Each time the rotational force of primary shaft is spun by motor it spins an off center cam inside a frame. The decoy head is attached to cam follower rod which has a flat base sitting atop the off center cam inside the frame using gravitational force to maintain contact with the cam and move in an up and down motion as the cam is spun by the motor. The waterfowl decoy's life-like head movement motion is thereby created.

A frame secures and guides the primary shaft and cam follower rod through slot holes within the frame. The primary shaft is secured through horizontal slot holes, and the cam follower rod is secured through a vertical slot hole. These slot holes allow for the rotation of the shaft and the up and down cam follower rod movement. The on/off circuit switch of decoy allows for the operator to be positioned in a blind off to the side while the decoy apparatus operates the present invention. Attachment posts within the decoy secure the shaft frame, motor, battery connections and switch. Mounting brackets secure mechanics to prevent movement/displacement of pieces during use and transport.

In the alternative "level wind" worm gear and pawl apparatus that can be substituted into the decoy, the motor rotates the primary shaft in turn rotating the attached reversible groove shaft (worm gear) in a circular direction. This circular rotation to the reversible groove shaft (worm gear) causes the decoy head which is attached to a rod attached to the a carriage (pawl) guide to move in an up and down head pumping motion as the carriage follower (pawl) transverses the reversible groove shaft (worm gear) and slides up and down the channel guide while the carriage (pawl) guide maintains contact and position of the reversible groove shaft (worm gear) and carriage follower (pawl). When the operator of the apparatus turns the device switch off the battery circuit is closed and stops mechanic movement of the apparatus.

Alternative connection of primary motor shaft to reversible groove shaft (worm gear) can be manipulated by various sized grooved gears, pulleys and belts, in such a manner as to realistically simulate the movement of real bird movements and rhythmic patterns during waterfowl mating behavior rituals. As is apparent, the decoy can be made in the form of any waterfowl and can be used on substantially any water body and under a variety of weather conditions. In accordance with other aspects of the preferred embodiment, gears and pulleys between primary motor shaft and reversible groove shaft (worm gear) can vary in size and number and shape to allow for rotational shaft speed variations. These variations cause carriage follower (pawl) to move up and down the reversible groove shaft (worm gear) at different speeds simulating specific rhythmic patterns and head pumping motions.

It is rotated and driven by a rotary shaft motor that exhibits a substantially constant torque over its range of operation. The motor voltage and torque maintains the proper tension, power, and force and battery life to continue decoy head pumping action during a hunt.

The primary motor shaft is directly attached (or alternatively attached by pulley, belt or gear) to reversible groove shaft (worm gear). This arrangement causes the primary shaft of decoy to rotate 360 degrees continually while motor is engaged by battery power circuit. Each time the rotational force of primary shaft is spun by motor it spins the reversible groove shaft (worm gear) inside two mounting brackets and a channel guide. The decoy head and neck is attached to a carriage follower (pawl) rod which is secured to the carriage (pawl) guide. The carriage follower (pawl) is also attached to the carriage (pawl) guide. The carriage (pawl) guide encircles a channel guide containing the rotating reversible groove shaft (worm gear) and allows for movement of carriage (pawl) guide along the channel guide as the carriage follower (pawl) tracks the reversible groove shaft (worm gear) grooves. Gravitational force and carriage (pawl) guides cause carriage follower (pawl) on reversible groove shaft (worm gear) to maintain contact and follow the machine shaft grooves. As it follows the grooves the carriage follower (pawl) moves the carriage (pawl) guide in an up and down motion along the vertical channel guide as the reversible grooved shaft is spun by the motor. The waterfowl decoy's life-like head movement motion is thereby created as the carriage (pawl) attachment rod attached to the carriage (pawl) guide and decoy head and neck follow the vertical channel guide and carriage follower (pawl) movement.

A base frame for mounting block secures the mounting block. The mounting block secures a motor bracket that secures the motor and two mounting brackets which secure the channel guide and reversible groove shaft, a carriage (pawl) guide encircles the channel guide and able to freely slide vertically up and down along the channel guide. A carriage follower (pawl) held in the grooves of the reversible groove shaft by the carriage (pawl) guide require the carriage follower (pawl) and carriage (pawl) guide to move when reversible groove shaft is rotated. An electric motor primary shaft is attached to the motor, which directly connects to the reversible groove shaft (worm gear) and creates the force required for reversible groove shaft to rotate during operation. The carriage (pawl) attachment rod attached to the carriage (pawl) guide supports the decoy head in the proper vertical position for vertical up and down decoy head movement as the carriage (pawl) guide follows the vertical channel guide. The reversible grooved shaft is secured between two slot holes of two mounting brackets, and the carriage follower (pawl) rod is secured by screws to the carriage (pawl) guide. The carriage follower (pawl) is secured within the carriage (pawl) guide in a manner in which to maintain position within the grooves of the reversible groove shaft (worm gear) grooves. The carriage follower (pawl) slides along grooves of shaft during rotation of the shaft. The on/off circuit switch of decoy allows for the operator to be positioned in a blind off to the side while the decoy apparatus operates the present invention. Alternative mechanisms may be installed for remote control access to on/off circuit switch for device control when the hunter is located within the hunting blind.

Other objectives of this present invention will become apparent to those skilled in this art from the following description wherein there is shown and described a preferred embodiment of this invention, simply by way of example of one of the modes best suited to carry out the invention. As it will be realized, the invention is capable of other different embodiments and its several details are capable of alteration in various, obvious aspects all without departing from the invention. Accordingly, the drawings and descriptions will be regarded as illustrative in nature and not as restrictive.

DETAILED DESCRIPTION OF THE PREFERRED EMBODIMENT

Reference is now made to FIG. 1 illustrating the decoy apparatus for simulating, when viewed at a distance, the movement of the waterfowl decoy head in an up and down vertical motion on a floating decoy. A decoy is floated on the water with a traditional string tether and weight attached to the decoy keel. A game bird, such as a male mallard, is shown as the illustrated decoy, but any simulation of any waterfowl that is of interest to act as a decoy, may be used with this apparatus. Within the decoy the cam follower rod (6) holds the head (18) which sits on an off center cam (1) which is rotated by a primary shaft (4) powered by belt (13) from a small rotating shaft motor (3 and 8). This mechanical action allows head pumping/bobbing action of the decoy head. The neck of the decoy (17) is made of material designed to provide flexibility and durability during the downward and upward vertical movement of the waterfowl decoy's head during operation. Duck decoy is equipped with a back lid (16) which is secured to the top of the waterfowl decoy with fasteners to latch lid (16). This opening is for insertion of the apparatus. In addition, the head of the decoy (18) is cut off at the base of the neck to allow the head to become moveable and allow insertion of the apparatus into the decoy.

The decoy package is delivered to the user without batteries (9). The users will then insert two to four 1.5 volt D-cell alkaline batteries (9) in the battery holder (9), activate the switch (14) to the "on" position, close the lid flap (16) and secure. The operating decoy is then ready for placing afloat to attract waterfowl by the vertical movement of the head.

Rotational force on the primary shaft (4) in the direction of the action arrow created by a belt (13) connected to the motor shaft (3 and 8) causing the shaft (4) to spin and rotate an off center cam (1) located within a frame (5). The cam follower (7) and rod (6) supporting the decoy head (18) at rod (6) and head attachment location (15) to move up and down while the off center cam (1) rotates and gravitational force causes the cam follower (7) and rod (6) to maintain contact with the cam (1). The action arrows show the movement as it is reversing from an up motion to a down motion. Due to the cam follower (7) and rod (6) raising and lowering from the off center rotating cam (1) it simulates the head pumping/bobbing motion of a waterfowl species as it performs mating behaviors in the water. That is, the decoy pivots up and down as a result of the cam (1) movement rotated by the primary shaft (4) (see FIG. 1). The head pumping or bobbing action can be modified to fit specific rhythms or patterns by reshaping the off center cam on primary shaft (FIG. 4, FIG. 4A, FIG. 4B, FIG. 4C).

Figure 2:
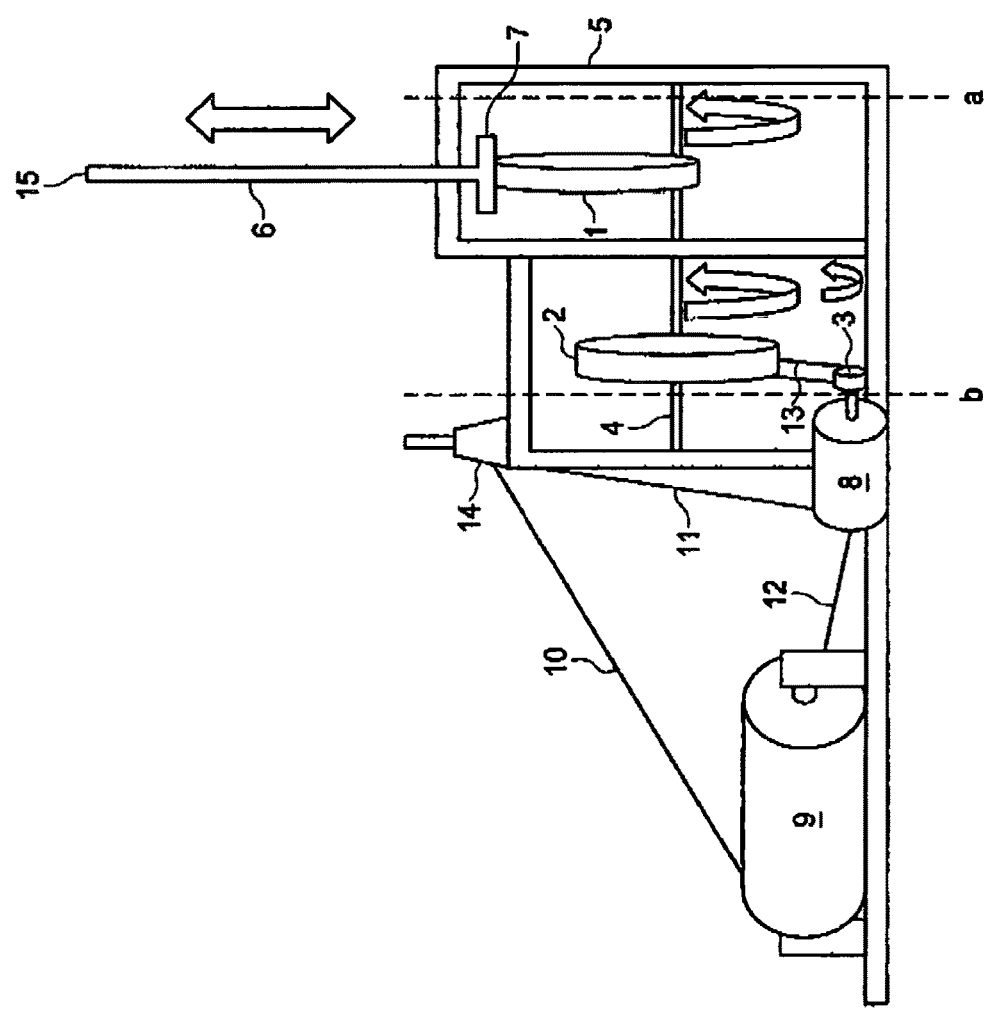
FIG. 2 is an oblique view of the apparatus which mounts inside of a commercial or handcrafted duck decoy. This is a side view of the removed decoy apparatus shown in FIG. 1, and it illustrates the up and down vertical head movement of the decoy in response to rotating off center cam (1). This is view of frame containing primary shaft (4) supporting the off center cam (1) and cam follower rod (6 and 7) mechanism of the apparatus according to the present invention as shown in FIG. 1.

FIG. 2 shows a side plan view of removed motive apparatus from decoy and illustrates in further detail how the primary shaft (4) and motor shaft (3) connected by belt (13) and cams (2 and 3) cooperate to create the shaft (4) rotating action needed to spin the off center cam (1). The rotational force of motor (8) rotates the shaft (4) (see arrows in FIG. 1-4) and the off center cam (1) within the frame spins. The tension on the belt (13) keeps the connection between primary shaft (4) and cam (2) with motor cam and shaft (3) taut. When the operator completes the battery (9) circuit by flipping the on/off switch (14) to motor (8), the shaft (4) begins continually rotating 360 degrees in response to the electric current provided by the battery (9) supply. When the motor shaft and cam (3) spin they therefore rotate the primary shaft (4) which in turn rotates the off center cam (1)

held in the frame (5) in which cam follower (7) and rod (6) sit (see FIGS. 1-4). The presence of framing guides (5) allows all pieces to remain secure during operation. The frame (5) is shaped to contain the primary components of the apparatus for facilitation of assembly into the decoy. It consists of a commercial or handcrafted low speed electric motor which is secured to frame (5) by brackets and fasteners (rivets, eyelets or brads) through bracket holes. A commercial or handcrafted battery holder (9) is secured to the frame (5) by fasteners (rivets, eyelets or brads). The battery holder (9) includes positive and negative contacts connected to the switch (14) and motor (8) and by wiring (10, 11 and 12). The battery holder (9) is sized for two 1.5 volt D-cell batteries (9).

Figure 3:
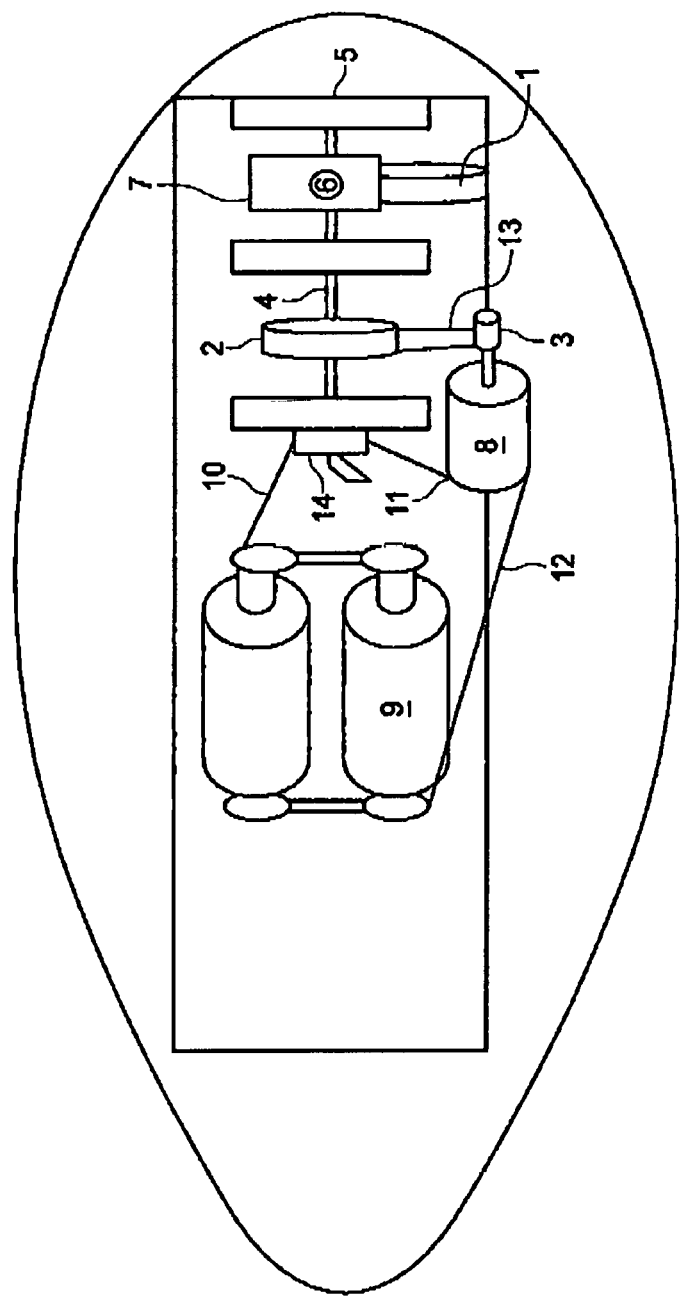
FIG. 3 is a top view of the apparatus mounted inside of a commercial or handcrafted duck decoy. The rotation of the motor (8) causes all cams, belts, shafts and rods to work in concert to oscillate the decoy's head up and down vertically.

FIG. 3 shows top view of the apparatus (FIG. 2) mounted inside of a commercial or handcrafted duck decoy. It illustrates the shaft (4) and cam system (1-3) including a frame (5) with slots embracing the cross piece primary shaft (4) which is free to rotate. The centered cam (2) is rigidly attached to the primary shaft (4) and connected to the motor shaft cam (3) by a belt (13). The primary shaft (4) and the motor shaft (8) are attached by two cams (2 and 3) and a belt (13) at the same place so that the 360 degree rotation is applied from the motor to the primary shaft. The shafts rotate relatively freely but a lubricant can be used to vary the motion as desired.

Figure 4:
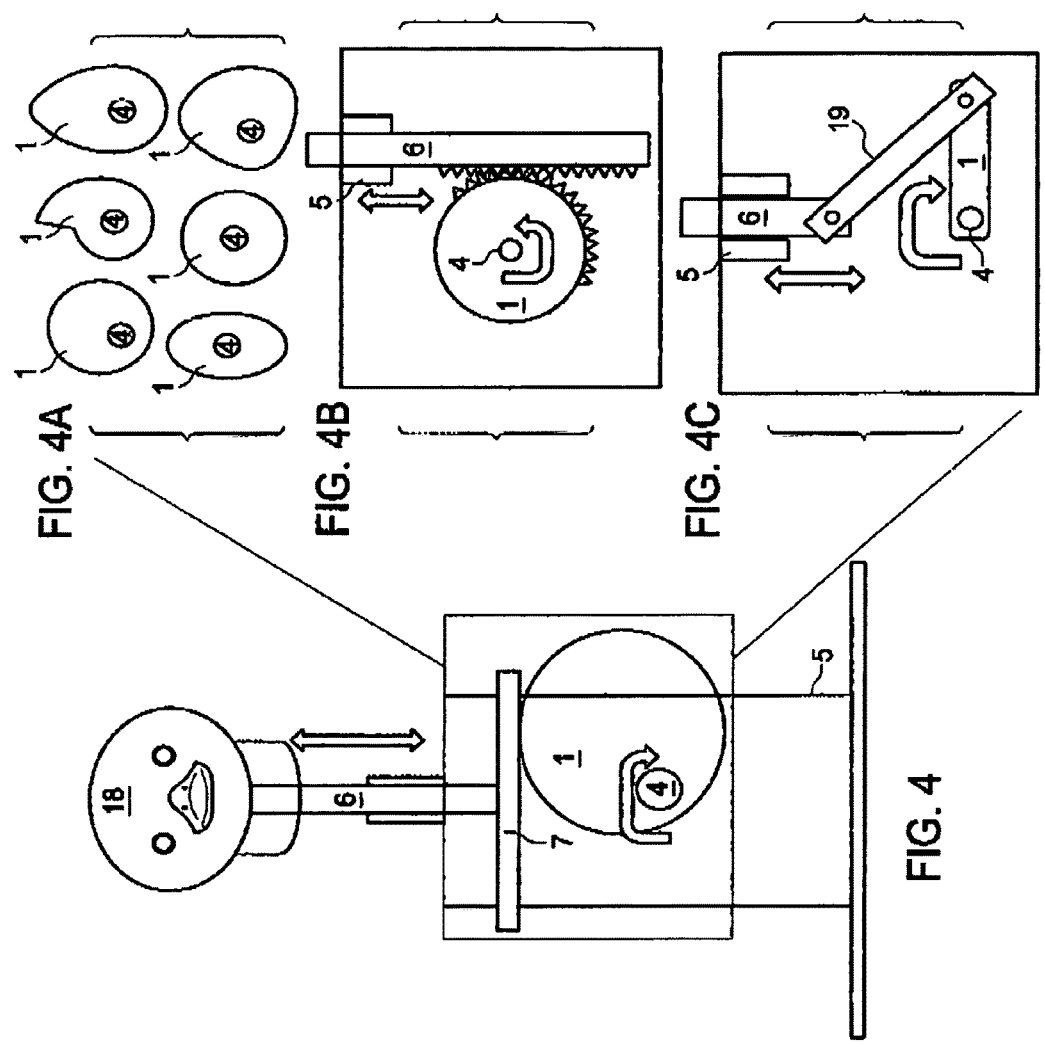
FIG. 4 is a cutaway cross-section from FIG. 2 and shows the operations mechanism of the forward portion of the apparatus as noted on FIG. 2 taken along section line (a) of FIG. 2.

FIG. 4 is a schematic drawing cutaway cross-section from FIG. 2 and shows the operations mechanism of the forward portion of the apparatus taken along section line (a) of FIG. 2. It illustrates how the primary shaft (4) for the decoy apparatus provides rotational force to cam (1) and reciprocating up and down vertical movement to cam follower (7) and rod (6).

FIG. 4A is a schematic drawing of alternative cam 1A (1) designs that can be substituted into the apparatus onto primary shaft (4) to achieve a variety of up and down vertical head movement patterns.

FIG. 4B is a schematic drawing of alternative cam 1B illustrating a partially notched cam 1 and notched rod (6) mechanism that can be substituted into the apparatus to achieve a variety of up and down vertical head movement patterns applied to the reciprocating movements of rod (6) and held within framing guides (5).

FIG. 4C is a schematic view of alternative cam (1) 1C illustrating a stationary cam (1) fixed arm attached to rod (6) mechanism by free moving double jointed arm (19) that can be substituted into the apparatus onto shaft (4) to achieve a variety of up and down vertical head movement patterns and distance by reciprocating up and down rod (6) movements when the cam (1) fixed arm rotates.

Figure 5:
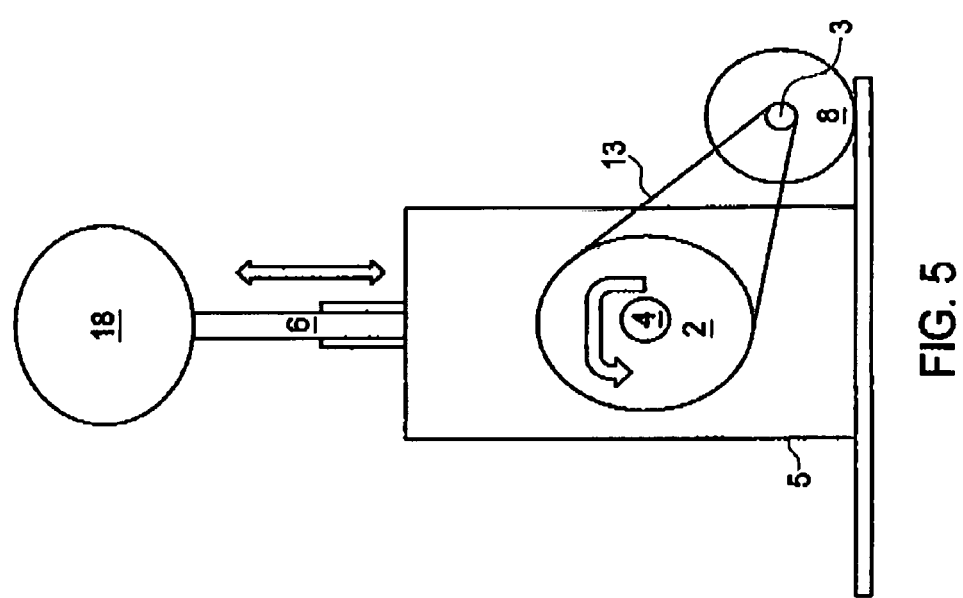
FIG. 5 is a cutaway cross-section from FIG. 2 and shows the operations mechanism of the rear portion of the apparatus as noted on FIG. 2 taken along section line (b) of FIG. 2.

FIG. 5 is a schematic drawing cutaway cross-section from FIG. 2 and shows the operations mechanism of the rear portion of the apparatus as noted on FIG. 2 taken along section line (b) of FIG. 2. It illustrates how the primary shaft (4) and the motor shaft (8) are attached by two cams (2 and 3) and a belt (13) at the same place so that the 360 degree rotation is applied from the motor to the primary shaft.

Figure 6:
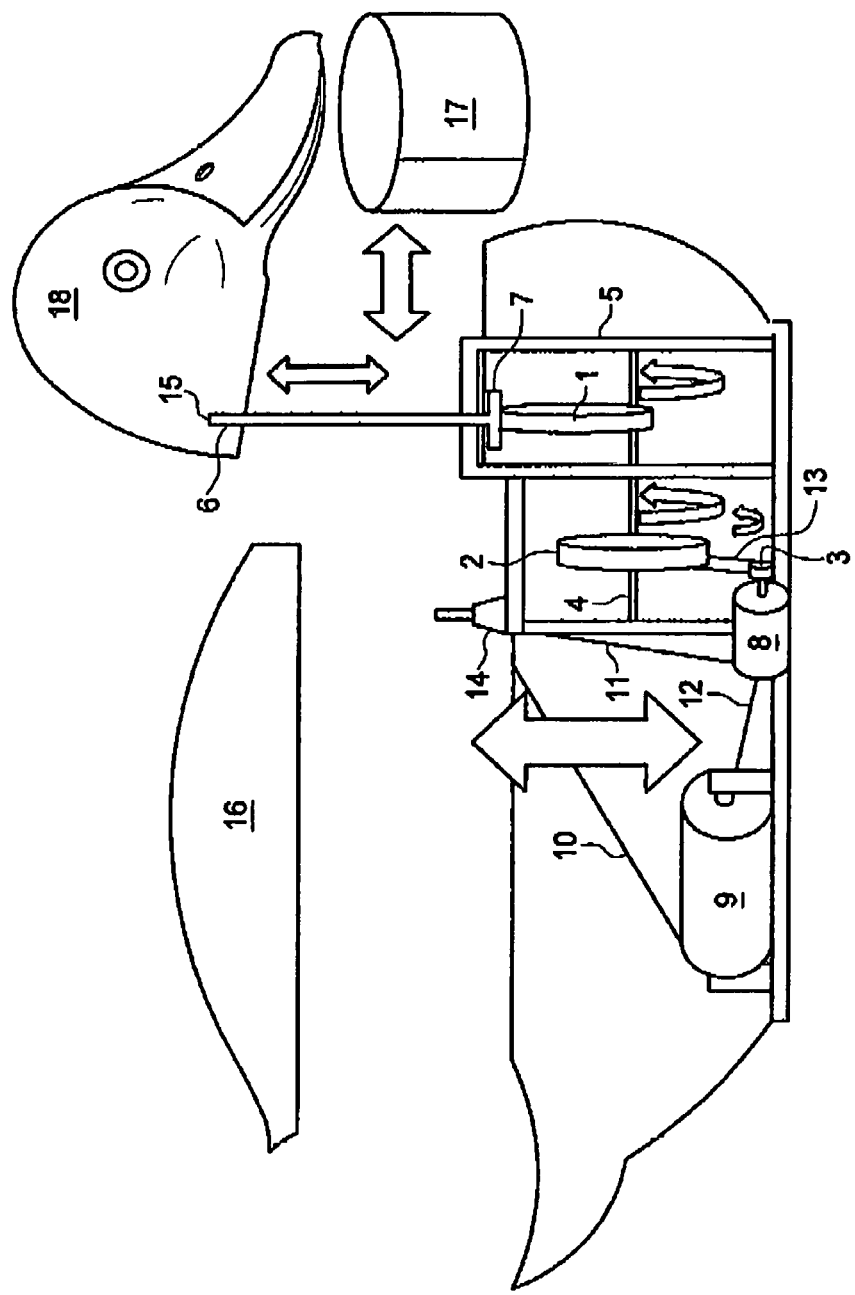
FIG. 6 is a side view of the decoy apparatus illustrating partial disassembly of back lid (16) and head (18), battery replacement (9), and on/off switch (14) for ease of use and deployment in the field for use.

FIG. 6 illustrates the manner in which the decoy mechanical apparatus is accessed to turn off and on (14), replace batteries (9) or to access belts (13), shaft (4) and cams (1,2 and 3). The decoy is made in four sections connected with hinges and clamps that allow for connection to each other and water resistance. In preparation for access you undo the neck (17) and back piece (16) clamps. The decoy neck and back attachment are moved by lifting after undoing clamps. When reassembling, the back and neck pieces can be pushed back into position and clamped down to secure.

Manual controller on/off switch for electronic motor allows for circuits to be completed or broken. Batteries provide power to the mechanism. In operation, the operator makes an input through the on/off switch. In manual mode the motor can drive the shaft.

Figure 7:
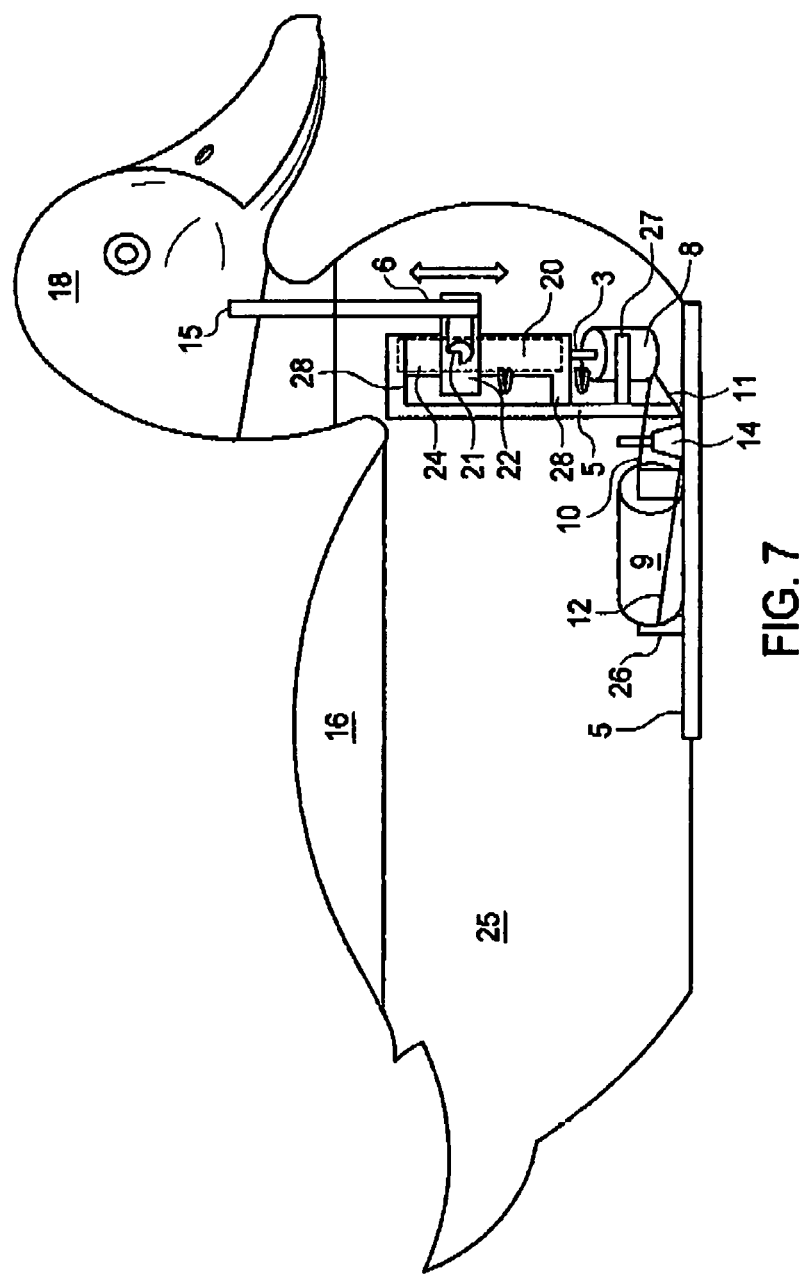
FIG. 7 is an oblique view of the commercial or handcrafted duck decoy in which the alternative "level wind" apparatus is mounted, including a modified removable head and neck (18), circuit switch (14) and back lid (16) with latch to reach the apparatus. This side view shows the preferred embodiment of a decoy apparatus for simulating, as viewed from a distance, the movement of waterfowl decoy head in a particular up and down vertical path according to the present invention.

FIG. 7 illustrating the decoy with alternative "level wind" apparatus for simulating, when viewed at a distance, the movement of the waterfowl decoy head in an up and down vertical motion on a floating hollow decoy (25). A decoy is floated on the water with a traditional string tether and weight attached to the decoy keel. A game bird, such as a male mallard, is shown as the illustrated decoy, but any simulation of any waterfowl that is of interest to act as a decoy, may be used with this apparatus. Within the decoy the carriage (pawl) rod (6) holds the head and neck (18) which securely attaches to the carriage (pawl) guide (22) which encircles the channel guide (24). The reversible groove shaft (worm gear) (20) is secured inside a vertical channel guide (24) between two slot holes of two mounting brackets (28) is able to freely rotate with primary motor shaft (3) when motor (8) is engaged. The reversible groove shaft (worm gear) (20) is grooved in opposite screw directions for reversible action of carriage (pawl) follower (21). A carriage (pawl) follower (21) is held inside the reversible groove shaft (worm gear) (20) grooves by a carriage (pawl) guide (22) which slides up and down along a vertical channel guide (24) secured between two mounting brackets (28). The reversible groove shaft (worm gear) (20) is directly (or alternatively connected by belt pulley or gear) to the primary rotating motor shaft (3). The carriage (pawl) attachment rod (6) attached to the carriage (pawl) guide (22) supports the decoy head and neck (18) by a head attachment screw (15) in the proper vertical position for vertical up and down decoy head movement as the carriage (pawl) guide (22) follows the vertical channel guide (24). This mechanical action allows head pumping up and down vertical movement of the decoy head in and out of the hollow duck decoy body (25). The duck decoy is equipped with a back lid (16) which is secured to the top of the waterfowl decoy with fasteners to latch lid. This opening is for insertion of the apparatus. In addition, the head and neck of the decoy (18) is cut off at the base to allow the head and neck to become moveable and allow insertion of the apparatus into the decoy.

The decoy package is delivered to the user without batteries (9). The users will then insert 2 to 4-9 volt batteries (9) in the battery holder terminals (26), activate the circuit switch (14) to the "on" position, close the lid flap back (16) and secure. The operating decoy is then ready for placing afloat to attract waterfowl by the vertical movement of the head.

Rotational force on the reversible groove shaft (worm gear) (20) in the direction of the action arrow connected to the primary motor shaft and motor (3 and 8) causing the reversible groove shaft (worm gear) (20) to spin and rotate within a mounting brackets (28) and channel guide (24). The carriage follower (pawl) (21) and carriage attachment rod (6) supporting the decoy head and neck (18) at rod (6) and head attachment location (15) to move up and down while the reversible groove shaft (worm gear) (20) rotates and gravitational force and pressure from carriage (pawl) guide (22) causes the carriage follower (pawl) (21) to maintain contact with the grooves of the reversible groove shaft (worm gear) (20). The action arrows show the movement as it is reversing from an up motion to a down motion. Due to the carriage follower (pawl) (21) and carriage attachment rod (6) secured to the a carriage (pawl) guide (22), raising and lowering as it follows the reversible grooves in the reversible groove shaft (worm gear) (20) it simulates the head pumping motion of a waterfowl species as it performs mating behaviors in the water. That is, the decoy pivots up and down as a result of the carriage follower (pawl) (21) and reversible groove shaft (worm gear) (201) movement rotated by the primary motor shaft (3) (see FIG. 7). The head pumping action can be modified to fit specific rhythms or patterns by inserted various sized grooved gears, or pulley and belts to the connection point of reversible groove shaft (worm gear) (20) and primary motor shaft (3) (FIG. 10, FIG. 10A, FIG. 10B).

Figure 8:
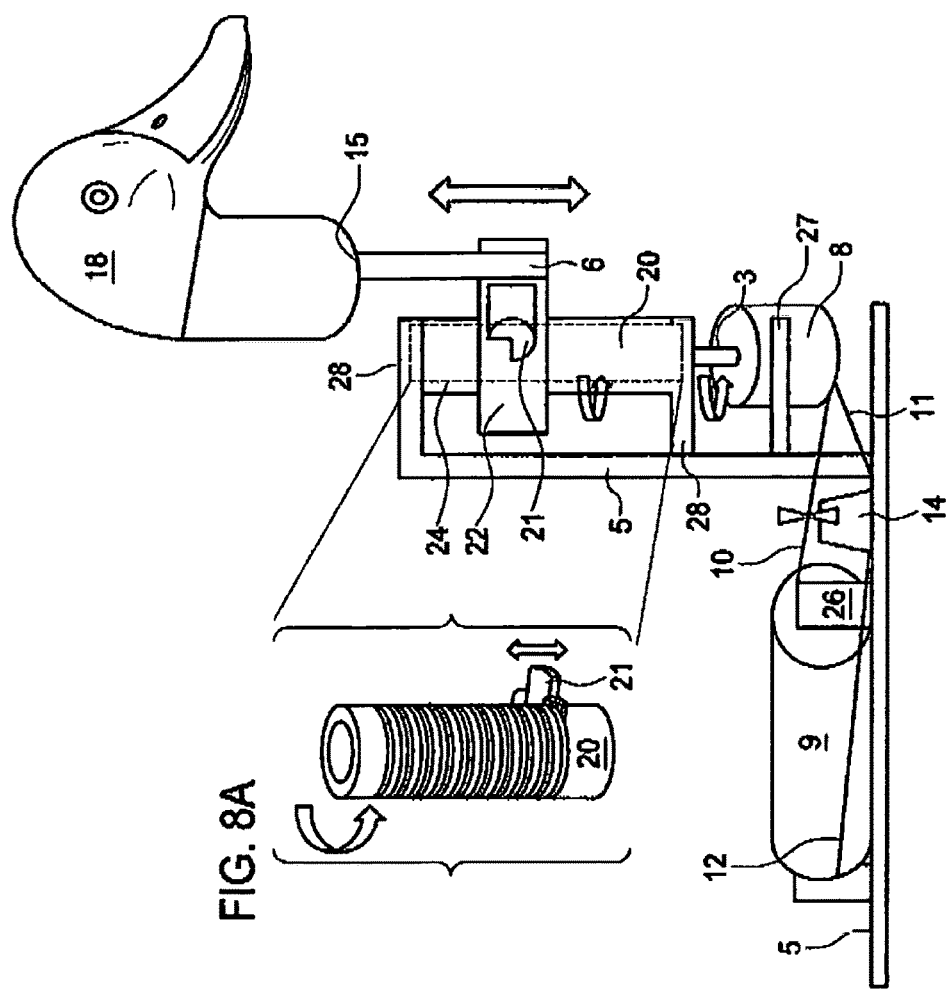
FIG. 8 is an oblique view of the alternative "level wind", apparatus which mounts inside of a commercial or handcrafted duck decoy. This is a side view of the removed decoy alternative "level wind" apparatus shown in FIG. 7, and it illustrates the up and down vertical head movement of the decoy in response to rotating reversible groove shaft (worm gear) (20). This view of a mounting block frame (5) supporting reversible groove shaft (worm gear) (20) the carriage follower (pawl) (21) and carriage attachment rod (6), are attached to a carriage (pawl) guide (22) which transverses the channel guide (24) and held in place by two mounting brackets (28) and a mounting block (5) that allow for free rotation of the reversible groove shaft (worm gear) (20) by the motor (8) mechanism of the apparatus according to the present invention as shown in FIG. 7.

FIG. 8 shows a side plan view of removed motive apparatus from alternative decoy (see FIG. 7) and illustrates in further detail how the reversible grooved shaft (worm gear) (20) and motor shaft (3) directly connect. The rotational force of motor (8) rotates the reversible groove shaft (worm gear) (20) (see arrows in FIG. 7-11). The carriage follower (pawl) (21) and carriage connecting rod (6) (supporting the decoy head and neck (18) at rod (6) and head attachment location (15) secured to the carriage (pawl) guide (22) cooperate to follow the reversible grooves in the reversible grooved shaft (worm gear) (20) along a vertical path of channel guide (24) positioned between two mounting brackets (28). Gravitational and carriage (pawl) guide (22) force keeps the connection between reversible groove shaft (worm gear) (20) and carriage follower (pawl) (21). When the operator completes the battery (9) circuit by flipping the on/off circuit switch (14) to motor (8) through battery terminal (26) and circuit wiring (10, 11 and 12), the primary motor shaft (3) begins continually rotating 360 degrees in response to the electric current provided by the battery (9) supply. When the primary motor shaft spins it therefore rotates the directly connected reversible groove shaft (worm gear) (20) which in turn moves the carriage follower (pawl) (21) up and down the grooves of the reversible groove shaft (worm gear) (20). The presence of the carriage (pawl) guide (22) and channel guide (24) secured between two mounting brackets (28) secured to a mounting block (5) and base frame (5) allows all pieces to remain secure and maintain proper movement and position during operation. The base frame (5) channel guide (24), two mounting brackets (28) and mounting block (5) is shaped to contain the primary components of the apparatus for facilitation of assembly into the decoy. It consists of a commercial low speed electric motor which is secured to mounting block (5) by motor bracket (27) with fasteners (rivets, eyelets, screws or brads). A commercial or handcrafted battery terminal holder (26) is secured to the base frame (5) by fasteners (rivets, screws, eyelets or brads). The battery holder (26) includes positive and negative contacts connected to the circuit switch (14) and motor (8) and by wiring (10, 11 and 12). The battery holder (26) is sized for 2 to 4 3-volt batteries (9).

FIG. 8A shows a schematic drawing cutaway zoomed in view (FIG. 8) of grooves in the reversible grooved shaft (worm gear) (20) and how the carriage follower (pawl) (21) sits within these grooves.

Figure 9:
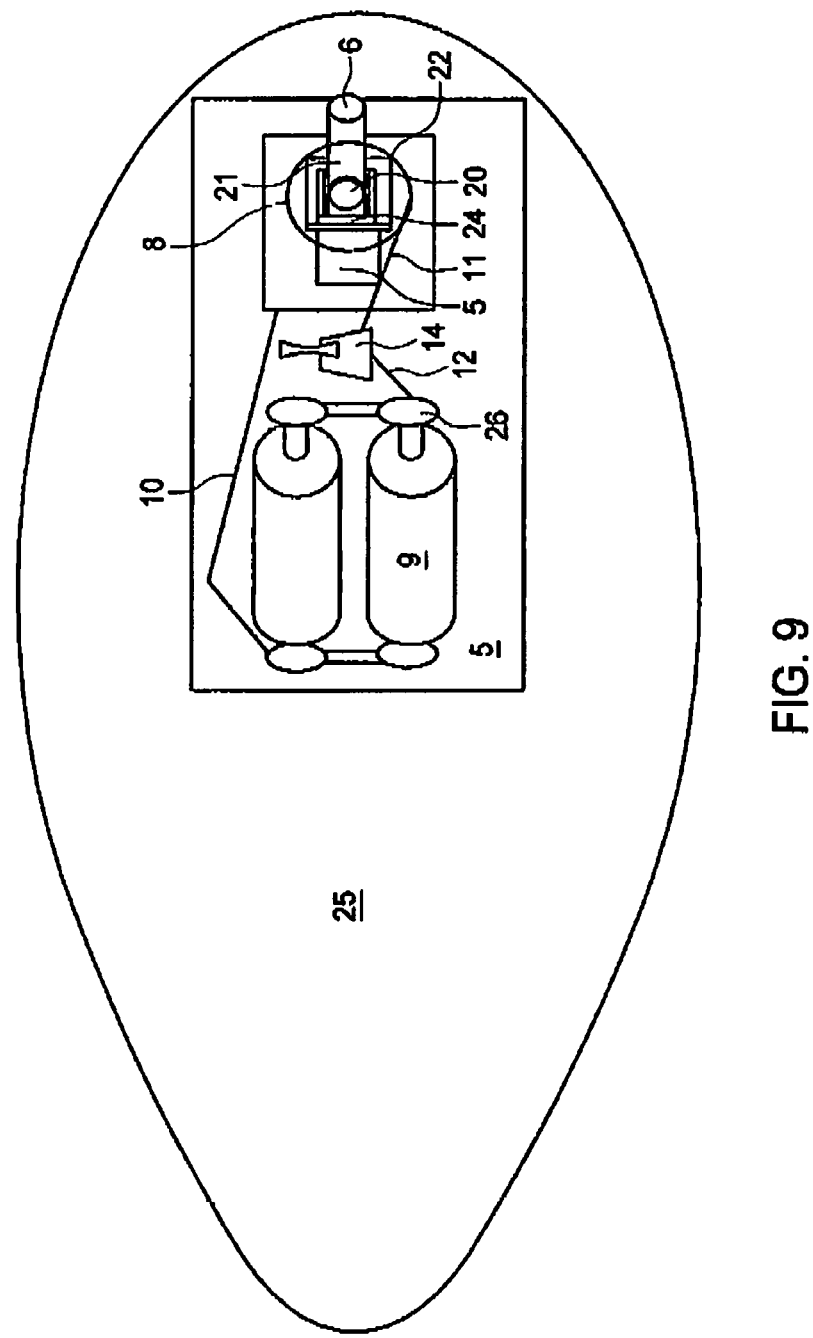
FIG. 9 is a top view of the alternative "level wind" apparatus shown in FIG. 8 mounted inside of a commercial or handcrafted duck decoy (25). The rotation of the motor (8) causes reversible groove shaft (worm gear) (20) and carriage follower (pawl) (21) to work in concert to oscillate the decoy's head up and down as it follows the carriage (pawl) guide (22) along the channel guide (24).

FIG. 9 shows top view of the alternative "level wind" apparatus (FIG. 7) mounted inside of a commercial or handcrafted duck decoy (25). It illustrates the small motor operated "level wind" mechanism (20 and 21) including a base frame (5), a mounting block (5), two mounting brackets (28) with slots embracing reversible groove shaft (worm gear) (20) and channel guide (24). The carriage follower (pawl) (21) is held within the grooves reversible groove shaft (worm gear) (20) (See FIG. 8A) by the carriage (pawl) guide (22) which traverses the vertical channel guide (24). The reversible groove shaft (worm gear) (20) and the motor (8) are directly attached so that the 360 degree rotation is applied from the motor to the primary shaft (3) to the reversible groove shaft (worm gear) (20). The reversible groove shaft (worm gear) (20) and carriage follower (pawl) (21) should slide relatively freely but a lubricant can be used to vary the motion as desired.

FIG. 10 is a schematic drawing and shows the removed motive alternative "level wind" apparatus from decoy of the forward portion of the apparatus. It illustrates how the primary motor shaft (3) for the decoy apparatus provides rotational force to reversible groove shaft (worm gear) (20) and reciprocating up and down vertical movement to carriage follower (pawl) (21) and attachment rod (6) attached to carriage (pawl) guide (22) move up and down the vertical channel guide (24).

FIG. 10A is a zoomed in schematic drawing of alternative grooved gears (29 and 30) connections of primary motor shaft (3) to the reversible groove shaft (worm gear) (20) that can be substituted into the alternative "level wind" apparatus to achieve a variety of up and down vertical head movement patterns.

FIG. 10B is a schematic zoomed in drawing of alternative belt (13) and pulleys (29 and 30) connections of primary motor shaft (3) to the reversible groove shaft (worm gear) (20) that can be substituted into the alternative "level wind" apparatus to achieve a variety of up and down vertical head movement patterns.

FIG. 11 illustrates the manner in which the decoy mechanical alternative "level wind" apparatus is accessed to turn off and on the circuit switch (14), replace batteries (9) or to access shafts (3 and 20) and carriage follower (pawl) (21). The decoy is made in three sections connected with clamps that allow for connection to each other and water resistance. In preparation for access you undo the back piece (16) clamps. The back attachment is moved by lifting after undoing clamps. When reassembling, the back (16) can be pushed back into position and clamped down to secure.

Manual controller on/off circuit switch (14) for electronic motor allows for circuits to be completed or broken. Batteries (9) provide power to the mechanism through battery terminals (26) and connecting wires (10, 11 and 12). In operation, the operator makes an input through the on/off circuit switch (14). In manual mode the motor (8) can drive the shafts (3 and 20).

In summary, it can be realized that the objectives, results and advantages sought have been obtained. A decoy apparatus and related method to more fully simulate the natural movement of waterfowl during mating, including up and down vertical head movement, is provided in a simple and easy to operate form. Furthermore, the decoy components are light, compact and enclosed within a standard decoy system. Under virtually all weather conditions, reliable operation is obtained, and the entire apparatus is virtually maintenance-free.

The previous description of the preferred embodiment of the invention has been presented for purposes of demonstration and description. It is not intended to be exhaustive or to limit the invention to the precise form disclosed. Obvious modifications or variations are possible in light of the above instructions. The embodiment was chosen and described to provide the best demonstration of the principles of the invention and its practical application to thereby enable one of ordinary skill in the art to utilize the invention in various embodiments and with multiple variations as are suited to the particular use contemplated. All such modifications and variations are within the scope of the invention as determined by the appended claims when interpreted in accordance with the breadth to which they are fairly, legally and equitably entitled.

The apparatus is designed for compactness and for ease of assembly and incorporation into a waterfowl decoy.

PATENT CITATIONS

| Cited Patent | Filing date | Publication date | Applicant | Title |
| --- | --- | --- | --- | --- |
| U.S. Pat. No. 740,293 | 11 Mar. 1903 | 29 Sep. 1903 | Gottlob E Loeble | Decoy. |
| U.S. Pat. No. 2,028,849 | 2 Apr. 1935 | 28 Jan. 1936 | Thomas Shay William | Flying decoy |
| U.S. Pat. No. 2,174,211 | 17 Jun. 1939 | 26 Sep. 1939 | Hutaff Jr George H | Decoy |
| U.S. Pat. No. 2,547,286 | 18 Oct. 1946 | 3 Apr. 1951 | Sabin James O | Animated decoy |
| U.S. Pat. No. 2,624,144 | 15 Apr. 1949 | 6 Jan. 1953 | F G Whiteside | Duck decoy support |
| U.S. Pat. No. 2,726,469 | 8 Mar. 1952 | 13 Dec. 1955 | Becker Henry C | Remotely actuated mechanical decoy-devices |
| U.S. Pat. No. 2,793,456 | 31 May 1955 | 28 May 1957 | Argo Riley D | Duck decoy |
| U.S. Pat. No. 4,128,958 | 8 Jun. 1977 | 12 Dec. 1978 | Marvin Snow | Water fowl decoy |
| U.S. Pat. No. 4,304,194 | 27 Mar. 1980 | 8 Dec. 1981 | Larry Altom | Automatic poultry growth stimulator system |
| U.S. Pat. No. 4,535,560 | 27 Sep. 1982 | 20 Aug. 1985 | Roy & Kiesel | Duck decoy movement apparatus |
| U.S. Pat. No. 4,599,819 | 28 Oct. 1985 | 15 Jul. 1986 | Greg Voges | Decoy dabbler |
| U.S. Pat. No. 4,910,905 | 5 Oct. 1988 | 27 Mar. 1990 | Girdley Gary J | Decoy system |
| U.S. Pat. No. 4,965,953 | 10 Jul. l989 | 30 Oct. 1990 | Mckinney Richard H | Remote controlled turkey decoy |
| U.S. Pat. No. 5,168,649 | 19 Feb. 1992 | 8 Dec. 1992 | David Wright | Turkey decoy |
| U.S. Pat. No. 5,289,654 | 19 Jan. 1993 | 1 Mar. 1994 | Arthur Denny | Animated wildfowl decoy |
| U.S. Pat. No. 5,459,958 | 3 Feb. 1994 | 24 Oct. 1995 | Reinke; Darrell D. | Decoy mechanism for adaptation to create vertical movement and coincident vocalization |
| U.S. Pat. No. 5,632,110 | 26 Jun. 1996 | 27 May 1997 | Roy; Roch | Deer decoy |
| U.S. Pat. No. 5,791,081 | 3 Jul. 1997 | 11 Aug. 1998 | Turner; Michael L. | Deer decoy |
| U.S. Pat. No. 5,832,649 | 11 Mar. 1997 | 10 Nov. 1998 | Kilgore; Charles | Decoy mobile |
| U.S. Pat. No. 5,974,720 | 17 Nov. 1997 | 2 Nov. 1999 | Bowling; Patrick | Decoy apparatus for attracting animals |
| U.S. Pat. No. 6,079,140 * | 13 Oct. 1999 | 27 Jun. 2000 | Brock, Iv; Robert C. | Motion system for decoys |
| U.S. Pat. No. 6,138,396 | 21 Sep. 1999 | 31 Oct. 2000 | Reelfoot Outdoor Company, Llc | Waterfowl decoy towing system |
| U.S. Pat. No. 6,658,782 | 2 Dec. 2002 | 9 Dec. 2003 | George W. Brint | Animated decoys |
| U.S. Pat. No. 6,698,132 | 9 Dec. 2002 | 2 Mar. 2004 | George W. Brint | Bird decoy and method |
| U.S. Pat. No. 6,834,458 | 6 Feb. 2003 | 28 Dec. 2004 | Ebsco Industries, Inc. | Feeding flock decoy assembly |
| U.S. Pat. No. 6,905,035 | 21 May 2001 | 14 Jun. 2005 | Sharper Image Corporation | Accessory organizer |
| U.S. Pat. No. 6,907,688 | 30 Oct. 2003 | 21 Jun. 2005 | George W. Brint | Flying and simulated wounded mechanical bird decoys and method |
| U.S. Pat. No. 7,076,909 | 14 Oct. 2004 | 18 Jul. 2006 | Heinn Darrell A | Decoy sled |
| U.S. Pat. No. 7,192,328 | 23 Dec. 2003 | 20 Mar. 2007 | Tangle Inc. | Toy for simulating character motion |
| U.S. Pat. No. 7,272,905 | 3 Oct. 2006 | 25 Sep. 2007 | Horton Albert E | Turkey decoy system |
| U.S. Pat. No. 7,287,352 | 23 Sep. 2004 | 30 Oct. 2007 | Kirby Richard C | Decoy with movable head and/or tail portions |
| U.S. Pat. No. 7,562,487 | 31 May 2007 | 21 Jul. 2009 | Barr Thomas A | Decoy movement system for simulating life-like movement of animal species |
| U.S. Pat. No. 8,151,512 | 11 Mar. 2009 | 10 Apr. 2012 | Ron Latschaw | Flying bird replica |
| U.S. Pat. No. 8,291,634 | 16 Apr. 2009 | 23 Oct. 2012 | Ralph White | Motion decoy system |
| U.S. Pat. No. 8,479,436 | 9 Jul. 2011 | 9 Jul. 2013 | Elliott Tool Company | Waterfowl decoy motion system |
| U.S. Pat. No. 8,893,425 | 15 Aug. 2011 | 25 Nov. 2014 | Edward James Tanner | Wild turkey decoy method and apparatus |
| U.S. Pat. No. 8,938,905 | 13 Oct. 2010 | 27 Jan. 2015 | Moore Outdoors Productions and Products | Device to attract deer |
| U.S. Pat. No. 9,044,005 | 24 Aug. 2011 | 2 Jun. 2015 | Wayne A. McGregor | Remote controlled target supporting device and cargo carrier |
| U.S. Pat. No. 9,044,006 | 26 Jun. 2012 | 2 Jun. 2015 | Primos, Inc. | Game decoy lift apparatus and methods |
| US20040107623 | 30 Oct. 2003 | 10 Jun. 2004 | Brint George W. | Flying and simulated wounded mechanical bird decoys and method |
| US20040159038 | 18 Feb. 2003 | 19 Aug. 2004 | Robert Hageman | Wild game conditioning system and method |
| US20040250461 | 10 Jun. 2003 | 16 Dec. 2004 | Dryer Mark A. | Remotely operated expandable and automatically contractible strutting tale decoy |
| US20050132632 | 23 Dec. 2003 | 23 Jun. 2005 | Fisher Tony M. | Motion-based hunting decoy |
| US20050160654 | 26 Jan. 2004 | 28 Jul. 2005 | Roberto Cosciani | Decoy and movement system |
| US20050268522 | 24 May 2005 | 8 Dec. 2005 | Eastman Holding Company | Adapter stand for use with a buoyant waterfowl decoy, kit including the adapter stand, and method of using same |
| US20060053675 | 15 Aug. 2005 | 16 Mar. 2006 | Glenn Lindaman | Decoy and support therefor |
| US20060080884 | 14 Oct. 2004 | 20 Apr. 2006 | Heinn Darrell A | Decoy sled |
| US20060143968 | 25 Apr. 2005 | 6 Jul. 2006 | Brint George W | Device coupling and method for producing erratic motion in decoys |
| US20060143970 | 4 Jan. 2006 | 6 Jul. 2006 | Glenn Lindaman | Stake for a decoy |
| US20120198752 | | 9 Aug. 2012 | James Lee Steinhausen | Decoy Locomotion and Movement Device |
| US20130042515 | 15 Aug. 2011 | 21 Feb. 2013 | Edward James Tanner | Wild Turkey Decoy |
| U.S. Pat. No. 6,775,943 | 18 Nov. 2002 | 17 Aug. 2004 | Van J. Loughman | Manually movable decoy device |
| U.S. Pat. No. 3,614,019 | May 13, 1970 | Oct. 19, 1971 | Bowen Tools Inc | Apparatus for controlling the wrapping of tubing onto a reel |
| U.S. Pat. No. 4,410,297 | Jan. 19, 1981 | Oct. 18, 1983 | Lynch Robert P | Marine continuous pipe laying system |
| U.S. Pat. No. 4,767,073 | Feb. 20, 1986 | Aug. 30, 1988 | Malzacher Fred H | Cable spooling system |
| U.S. Pat. No. 5,950,953 | Jan. 27, 1998 | Sep. 14, 1999 | Benton F. Baugh | Reel with adjustable fleet angle |
| U.S. Pat. No. 6,012,684 | Dec. 24, 1996 | Jan. 11, 2000 | General Electric Company | Braze bracket for a turbine engine |
| U.S. Pat. No. 7,150,425 | May 28, 2003 | Dec. 19, 2006 | Reelcraft Industries, Inc. | Adjustable reel assembly |
| U.S. Pat. No. 7,210,647 | May 23, 2005 | May 1, 2007 | Patco Machine And Fabricating, Inc. | Reel with level winding mechanism |
| U.S. Pat. No. 7,363,968 | Feb. 17, 2005 | Apr. 29, 2008 | Benton Frederick Baugh | Umbilical reel safety release |
| U.S. Pat. No. 7,669,795 | Apr. 24, 2008 | Mar. 2, 2010 | Ian Anthony Brown | Reel assembly |
| US20060273213 | Jun. 6, 2005 | Dec. 7, 2006 | Jason Turk | Level-wind system for coiled tubing |
| U.S. Pat. No. 1,819,724 | 7 Feb. 1929 | 18 Aug. 1931 | Horton Mfg Company | Fishing reel |
| U.S. Pat. No. 3,614,015 | 10 Nov. 1969 | 19 Oct. 1971 | Sussman Irving | Easy-loading fishing reel |

-continued

| PATENT CITATIONS | | | | |
|---|---|---|---|---|
| Cited Patent | Filing date | Publication date | Applicant | Title |
| U.S. Pat. No. 4,042,186 | 20 Oct. 1975 | 16 Aug. 1977 | Abu Aktiebolag | Fishing reel with bearing for level wind shaft |
| U.S. Pat. No. 4,747,560 | 11 Mar. 1987 | 31 May 1988 | Abu Garcia Produktion Ab | Fishing reel with level wing |
| U.S. Pat. No. 4,919,362 | 2 Jun. 1989 | 24 Apr. 1990 | Abu Garcia Producktion Ab | Fishing reel of the multiplier type |
| U.S. Pat. No. 5,131,596 | 12 Jun. 1991 | 21 Jul. 1992 | Shimano Industrial Company, Ltd. | Double bearing fishing reel with fishing line guide mechanism |
| U.S. Pat. No. 5,158,245 | 5 Feb. 1991 | 27 Oct. 1992 | Abu Garcia Produktion Ab | Fishing reel of the multiplier type |

I claim:

1. An improved motorized waterfowl decoy apparatus for simulating and mimicking the up and down vertical head movement of bird species during courtship behaviors, comprising:
   (a) a decoy body, said decoy body having a continuous hollow cavity, said continuous hollow cavity extending without interruption throughout said decoy body;
   (b) a motor attached to interior of said decoy body by an interior frame, said motor imparting reciprocating head movement to said decoy;
   (c) said motor being battery powered and containing horizontal output motor shaft;
   (d) an output motor shaft, said output motor shaft connected to said motor in a manner such that rotational motion is delivered to said shaft and attached motor cam;
   (e) said motor cam on output motor shaft connected to said primary shaft centered cam at a right angle and rotating in a horizontal plane connected by a belt;
   (f) said primary shaft centered cam attached to the primary shaft, said primary shaft being connected to the distal end of said primary shaft through frame holes;
   (g) an off center cam connected to said primary shaft, said primary shaft being capable of rotational movement, such that the circular rotation of said primary shaft moves said off center cam in an off center manner;
   (h) a cam follower rod with flat base sits on the off center cam and moves in a vertical plane as it moves within a slider; and
   (i) a decoy head attached to the upper end of said cam follower rod, wherein the entire said decoy head moves upward and downward in a head pumping and bobbing motion that corresponds to the vertical movements of said cam follower rod and said off center cam rotational force, wherein said decoy head moves up and down vertically, wherein said decoy head does not twist from side to side, move forward or backward or touch the water.

2. The waterfowl decoy as described in claim 1, said decoy further comprising a switch, said switch allowing a user to selectively operate said motor by completing circuit to said battery power and motor.

3. The waterfowl decoy as described in claim 1, said decoy off center cam design and shape can be manipulated, in such a manner as to realistically simulate the movement of a real bird's movements and rhythmic patterns during waterfowl mating behavior rituals comprising:
   (a) shape variations;
   (b) notched cam to notched cam follower; and
   (c) fixed rotating arm cam mechanisms which allow for varied vertical movement distances and rhythmic patterns.

* * * * *